United States Patent [19]
Lipner et al.

[11] Patent Number: 5,881,115
[45] Date of Patent: Mar. 9, 1999

[54] METHOD AND SYSTEM FOR AUTOMATICALLY EXECUTING MULTIPLE PROCEDURES FOR A COMPLEX PROCESS FACILITY

[75] Inventors: Melvin H. Lipner, Monroeville; Roger A. Mundy, North Huntingdon; Theodore J. Batt, Penn Hills, all of Pa.

[73] Assignee: CBS Corporation, Pittsburgh, Pa.

[21] Appl. No.: 989,999

[22] Filed: Dec. 12, 1997

Related U.S. Application Data

[60] Provisional application No. 60/064,613 Nov. 7, 1997.
[51] Int. Cl.⁶ .................................. G21C 7/36; G06F 9/00
[52] U.S. Cl. ........................... 376/216; 364/146; 364/188
[58] Field of Search ...................................... 376/216, 259; 364/146, 188, 224.9, 528.21, 528.22; 702/182–185

[56] References Cited

U.S. PATENT DOCUMENTS

| | | |
|---|---|---|
| 4,552,718 | 11/1985 | Impink, Jr. et al. .................... 376/216 |
| 4,803,039 | 2/1989 | Impink, Jr. et al. ..................... 376/216 |
| 4,815,014 | 3/1989 | Lipner et al. ............................. 376/216 |
| 5,068,080 | 11/1991 | Impink, Jr. et al. ..................... 376/215 |
| 5,089,978 | 2/1992 | Lipner et al. ............................ 364/188 |
| 5,253,186 | 10/1993 | Lipner et al. ............................ 376/216 |
| 5,339,257 | 8/1994 | Layden et al. .......................... 364/552 |
| 5,351,200 | 9/1994 | Impink, Jr. .............................. 376/216 |
| 5,553,304 | 9/1996 | Lipner et al. ......................... 364/224.9 |

*Primary Examiner*—Daniel D. Wasil

[57] ABSTRACT

A Supervisory Sequential Controller Interface (SSCI) provides for automatic and manual sequencing of the sequential steps of multiple procedures simultaneously in a complex process facility while preserving operator supervisory control over each procedure. The SSCI includes an Executive Interface which gives the operator global control over all of the procedures and a Procedure Interface which is arranged such that the operator may ascertain the relevant information about a particular procedure, including the mode (auto/manual), the current step being executed and the relevant states of plant components and parameters for the current step. Multiple Procedure Interface screens may be displayed to monitor/execute multiple procedures running simultaneously.

26 Claims, 14 Drawing Sheets

METHOD AND SYSTEM FOR AUTOMATICALLY EXECUTING MULTIPLE PROCEDURES FOR A COMPLEX PROCESS FACILITY

This Application claims the benefit of U.S. Provisional Application Ser. No. 60/064,613, filed Nov. 7, 1997

BACKGROUND OF THE INVENTION

1. Field of the Invention

This invention relates to a method and system for aiding an operator in executing step by step procedures during the operation of a complex process facility. More specifically, it relates to simultaneous execution of multiple procedures, some or all of which can be automatically executed, and particularly, to maintaining operator supervisory control over each of the procedures under such circumstances.

2. Background Information

Operation of a complex process facility requires the assimilation of a large amount of data and evaluation of the status of the process and the various component systems from those data, and informed, decisive action based upon such evaluation. While much of the operation of the modern complex process facility is automatically controlled, overall supervision of the facility is always the responsibility of a human operator.

Typically, formal written plant operating procedures under either normal or emergency conditions are developed by experienced specialists. Such "paper" procedures have been used for many years particularly in facilities such as nuclear power plants. Recently, interactive computer-based systems for aiding the operator in the execution of complex operating procedures have been developed. For instance, U.S. Pat. No. 4,803,039 discloses such a system in which the sequential steps of a procedure are presented to the operator on a display screen. The system automatically monitors the appropriate parameters relevant to the procedure steps. Where conditions required by certain steps are not satisfied, alternatives are offered to the operator. In either case, a response is required from the operator before the system advances to either the next step or a step in another procedure commanded by the operator. U.S. Pat. No. 4,815,014 describes a related system that requires verification that an operator action has, in fact, been taken before it will advance to the next step in the procedure. The operator, however, may override the requirement for such verification. The interactive systems described to this point were hard coded therefore requiring the writing of new code and verification of all of the software when any changes were to be made, including altering of reference values of the various parameters. U.S. Pat. No. 5,553,304 overcomes this particular problem by describing the use of a relational database to generate and store equations representing the various sequential steps in the procedures. With such a system, changes can be made in the pertinent parameter values and even in the procedures themselves without the necessity to generate new code and verifying that code.

However, the interactive computer-based systems for assisting in the execution of complex process procedures currently require manual input by an operator to advance to a next step. They also only provide the ability to have one procedure active at a time. If the operator accepts a recommendation to transfer to another procedure, the exited procedure becomes inactive.

With the complexity of process facilities, such as especially nuclear power plants, increasing, there is a particular need for an improved system and method for accurately and expeditiously executing procedures in a complex process facility.

There is a particular need for such a method and system which permits multiple procedures to be active simultaneously.

This creates an additional need for a method and system which allows for the procedures to be executed automatically while maintaining operator supervisory control over the procedures.

SUMMARY OF THE INVENTION

These needs and others are satisfied by the invention which is directed to a supervisory sequential controller interface for executing procedures in a complex process facility. In particular, it relates to a method and system for automatically sequencing through the sequential steps of such procedures and providing an operator interface presenting to the operator a representation of the sequential steps as they are executed and which permits the operator to selectively assume manual control of the procedures. Preferably, a relational database is used to generate equations representing the sequential steps which then can be automatically or manually executed.

Starting conditions for automatic execution of the procedures can be established so that upon satisfaction of these conditions the procedure is initiated automatically. Stop conditions for automatically stopping a procedure can also be established.

Some of the procedural steps generate control signals which result in modification of process conditions. Such control signals can be automatically generated by a procedure which is running automatically. Some procedures call for verification that the control signal has been effective before advancing to the next step. In some instances, this may take some time. If the condition is not satisfied, the step is violated and the automatic sequencing will terminate requiring operator intervention. A suitable time delay can be provided to allow the command signal to take effect so that the process may continue automatically. Time delays can also be programmed into any of the steps of the procedure so that the operator may follow the sequence of steps during automatic execution.

The invention also includes sequencing through the steps of multiple procedures simultaneously and making available to the operator through the operator interface representations of the sequential steps of each of the multiple procedures as they are being executed. An important feature of the invention is the operator interface which is comprised of two parts: an Executive Interface and a Procedure Interface. The Executive Interface allows the operator to view and select the status of each of the procedures. The executive summary interface also allows the operator to globally select automatic sequencing so that as the start conditions are met for the various procedures they are automatically initiated. The Procedure Interface presents a representation of the current step of selected procedures. The current steps of multiple procedures can be presented in separate windows.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
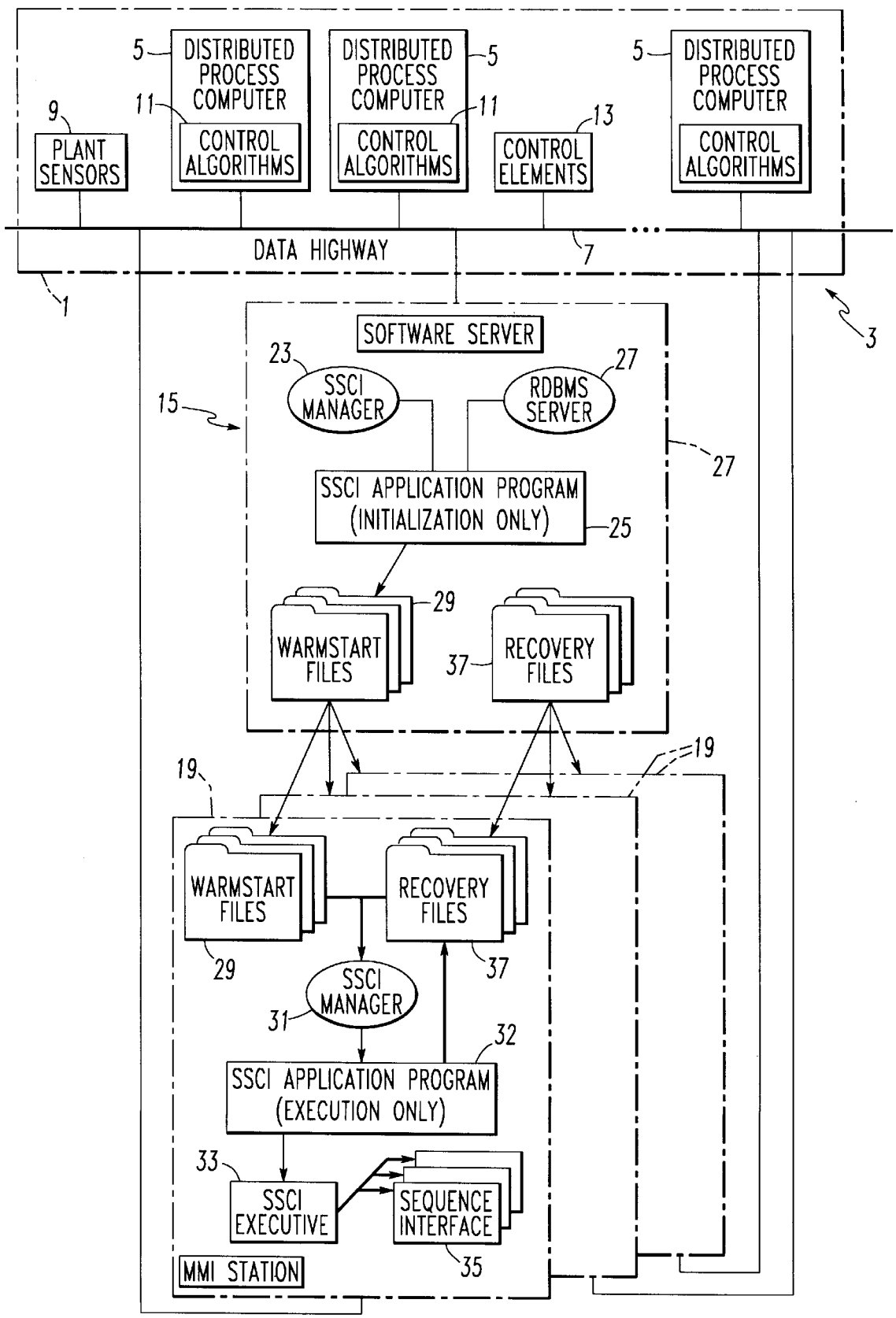
FIG. 1 is a schematic diagram of an interactive computer-based system in accordance with the invention.

FIG. 1 illustrates a complex process facility 1, such as a nuclear power plant, which is controlled by a distributed process control system 3. This distributed process control system 3 includes a number of distributed process control units (DPUs) 5 which are interconnected by a data highway 7. Plant sensors 9, which monitor various conditions and parameter values in the plant, provide plant data to the DPUs 5 over the data highway 7. DPUs 5 have distributed process computers which utilize the sensed plant conditions in control algorithms 11 to generate control signals which are transmitted over the data highway 7 to control elements 13 such as valves, pumps and the like.

The invention is directed to a Supervisory Sequential Controller Interface ("SSCI") system 15 which is an on-line work station-based system designed for plant operating procedure and sequential control applications. As used throughout, procedures and sequential control steps are considered interchangeable terms. The system is designed to provide an interface which allows for both user-paced (manual) and system-paced (automatic) procedure and sequence monitoring. Signals are both received from and transmitted to the plant-wide data highway 7 by the SSCI 15. The SSCI 15 includes a software server 17 and a number of man machine interface stations or work stations 19. The work stations 19 communicate with the SSCI server 17 over a network 21 such as an Ethernet. They also are connected to the data highway 7. The SSCI server 17 includes an SSCI manager 23 which controls implementation of an SSCI applications program 25 during initialization. The SSCI server 17 also includes a Relational Database Management System (RDBMS) server 27. The RDBMS server 27 hosts the software which generates and stores the equations representing the sequential steps of the procedures. This process is described in U.S. Pat. No. 5,553,304 which is hereby incorporated by reference.

The SSCI application program 25 generates a set of warm start files 29 which are transmitted to the work stations 19. These files contain the steps for the plurality of procedures. Another SSCI manager 31 in the work stations 19 utilizes the warm start files 29 to initiate operation of the SSCI application program 33 which executes the SSCI function at the work station. This application program 31 implements the two parts of the SSCI, the SSCI Executive Interface 33 and the sequence interface 35. The work stations 19 maintain recovery files 37 which continuously record the progress of the multiple procedures being executed. These recovery files 37 are transmitted back to the software server 17 so that if a workstation 19 fails execution of the procedure can be picked up by another work station 19 from the point just before the failed work station ceased operation. This precludes the necessity to start to a procedure all over again in the event of a failure of a work station.

The operator's primary roles are to monitor the progression through the selected plant procedures while maintaining a clear picture of plant state, to take control actions on the control board when they are required, and to watch for unsafe plant conditions. The operator retains both authority and responsibility for power plant operation. The SSCI 15 is designed to enhance the operator's ability to perform these functions.

Figure 2:
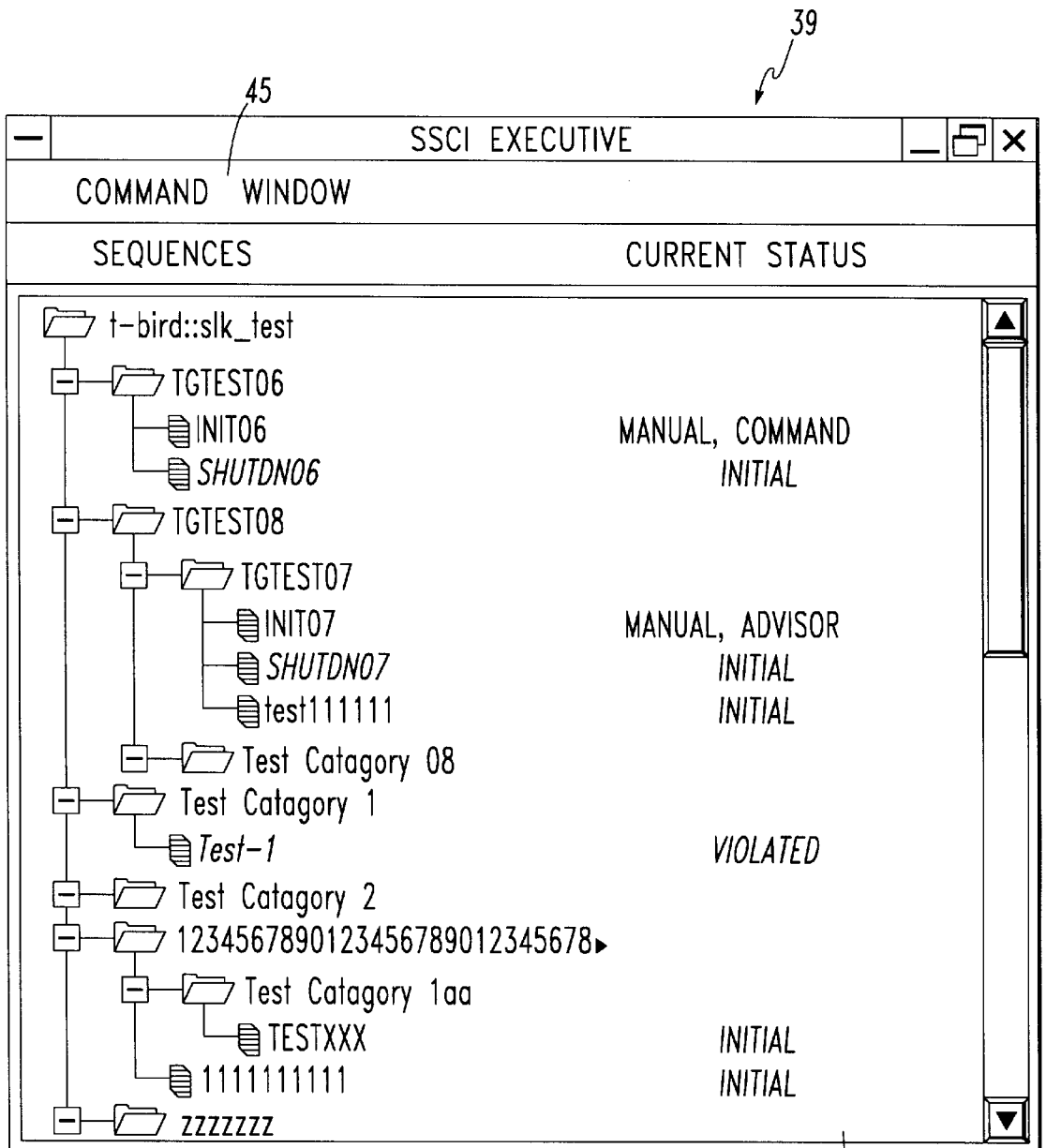
FIG. 2 illustrates an exemplary screen of the Executive Interface which is generated by the system of FIG. 1.

The Executive Interface 33 provides the operator with the ability to exercise global control of all of the procedures. An example of the Executive Interface screen 39 is shown in FIG. 2. The Executive Interface screen 39 is arranged such that the procedures 41 are arranged in a tree structure down the left side of the main section of the screen 39. The procedures 41 are grouped as determined by the data entered in the relational database management system 27 through a sequence builder tool in a manner described in U.S. Pat. No. 5,553,304. The operator may scroll through the entire list of procedures and choose those procedures to be started. As has been mentioned, one of the important features of the invention is that multiple procedures can be run simultaneously. The current status or mode of each of the procedures is presented on the right side of the main part of the screen 39. Another important aspect of the invention is that the procedures can be run manually or automatically. In the "manual" mode, the SSCI presents a current step to the operator and verifies the current conditions as required for certain of the steps. The operator, however, must initiate progression to the next step. In the "automatic" mode, the SSCI will advance to the next step if the pertinent conditions are verified. If the conditions are violated, however, the procedure will transfer to a "violated" mode which requires operator action. In FIG. 2, some of the procedures are in an "initial" state ready to start. When a procedure has been completed it will be placed in a "completed" mode.

Some procedures call for the activation of plant control elements 13. In some situations, it is desired that these actions not be taken. In those instances, the procedure can be placed in a "supervisory" state. If the control elements are to be actuated, as required, the procedure can be placed in the "command" state. Thus, as seen in FIG. 2, one of the procedures is in a "manual, command" mode and another is in the "manual, advisor" mode. In the upper portion of the Executive Interface screen 39 are the SSCI control buttons 45. These are soft switches which permit the operator to reset or stop all of the procedures or alternatively to exit the SSCI application. Another control button can be made available to allow the operator to recover files that would be generated from a failed work station.

Procedures can be automatically started when preselected start conditions develop. These start conditions can be easily set up and modified using the relational database management system 27. One of the available control buttons on the Executive Interface permits the operator to select or override automatic starting of the procedures. Automatic stopping conditions can also be entered and modified through the relational database management system 27. When the appropriate conditions are present, a procedure will automatically revert to the stopped mode. It can be appreciated, that the Executive Interface 33 provides the operator with overall view and control of the multiple procedures available.

Figure 3:
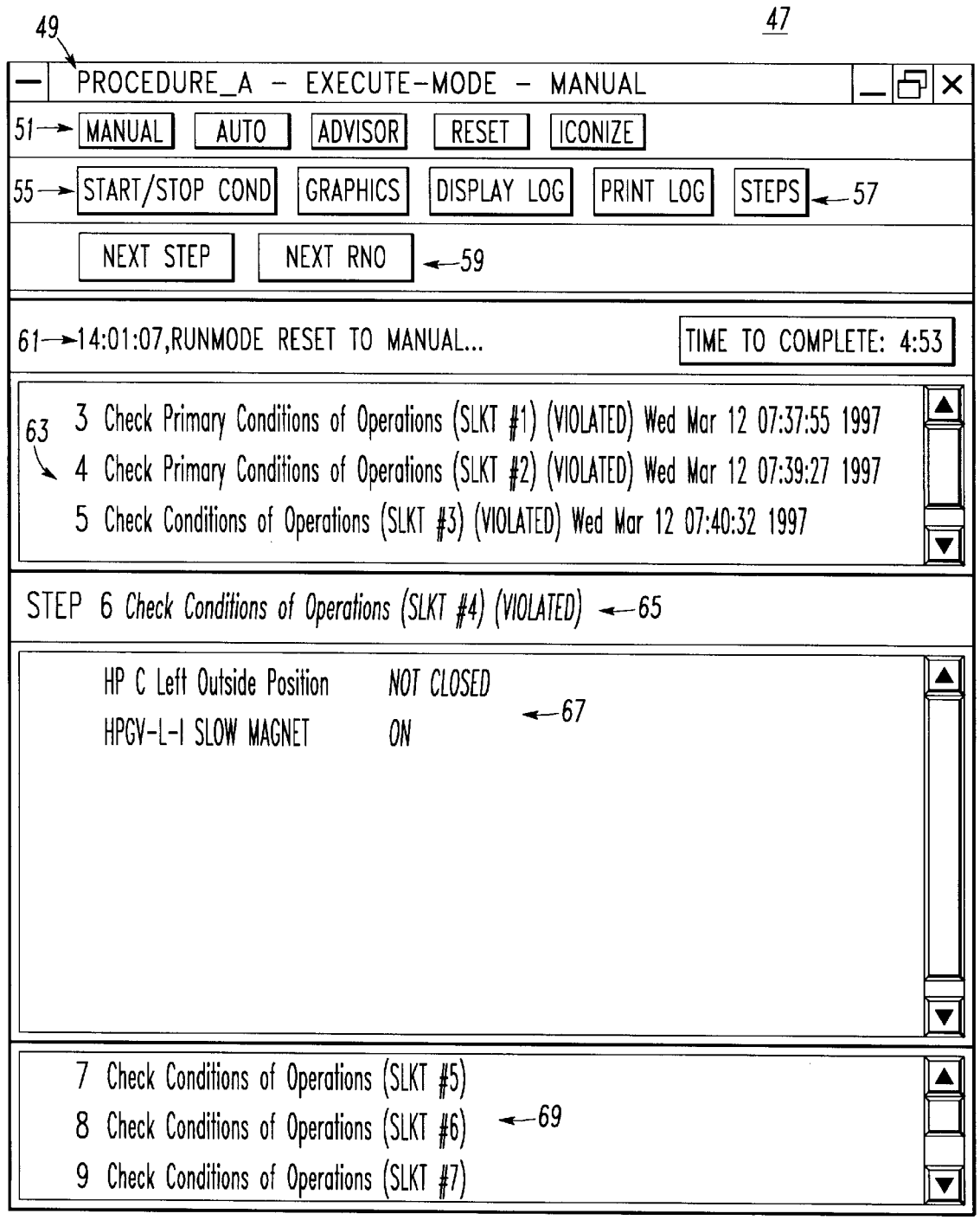
FIG. 3 illustrates an exemplary screen of the Procedure Interface which also forms part of the system.

The operator may select any of the procedures from the Executive Interface screen 39 for detailed viewing or for manual control. This brings up the Procedure Interface screen 47 which is shown in FIG. 3. This screen is arranged such that the operator may ascertain the relevant information about the procedure, including what mode the procedure is currently in, whether it is in manual or automatic control, and what is the current step of the procedure. Of primary interest are the relevant states of the components and parameters of the current step of the procedure which are displayed textually as well as with color coding.

Procedure Interface 47 screens of multiple procedures may be displayed simultaneously, such as where several procedures are being executed at the same time. The multiple procedures may each be displayed in a smaller window, or any one or more may be iconized, to be displayed at the operator's request.

Starting from the top of the Procedure Interface screen 47, the top line 49 displays the title of the procedure that is running and the mode that it is in. Proceeding downward on the Procedure Interface screen 47, the next section of the screen is reserved for mode selection buttons 51 such as "manual", "auto" and "command/advisor." The operator uses these buttons to establish the conditions under which the procedure is to be implemented. To the right of the mode the selection buttons are the sequence control buttons 53: "reset" and "iconized." The "reset" button allows the operator to reinitialize the procedure and start again. The "iconize" button allows the operator to dismiss the current procedure from the work space. However, it will remain in whatever mode it was in at the time, and the operator may display it again by using the Executive Interface screen 39.

Continuing downward on the Procedure Interface screen 47, the next section contains the sequence information buttons 55 with which the operator can control what additional information is displayed. The "start/stop condition" button will display the procedures starting/stopping condition information. The "graphics" button will allow the user to display an existing graphic which has been associated with the current step in the procedure. The "display log" button allows the operator to display a short version of the log which has been created by the system. This log will enable the operator to view the pathway taken by the procedure up to the current point in time. The "print log" button allows the user to send the short log to a line printer (not shown) with which the work station 19 is connected.

To the right of the sequence information buttons 55, is the "steps" button 57 which will produce a sequence step list of the steps in the procedure, with which the operator may select any step to be implemented, even if it is outside of the expected path through the sequence.

The next area of the screen is reserved for the user prompts 59. These prompts will be displayed as they are pertinent for a given procedure step; however, they will not be used unless the system is in "manual" mode. The prompts 59 will, for example, direct the operator to the next relevant step in the procedure, allow the operator to branch around steps, either forward or backward, and allow him to display alternate conditions of operation, if they exist for that step. The expected operator prompt will be highlighted by the SSCI 15, whether the system is in "manual" or "automatic" mode. In this way, the operator will see what the system expects the next action to be. However, when in "manual, " the operator will be able to choose whatever action he believes is appropriate, even if the action is different from that expected by the system. The operator is always is in control of the SSCI 15. The next space in the Procedure Interface screen 47 is the message area 61 where information concerning procedure starting/stopping conditions, for example, will be displayed. The timers associated with steps are also displayed here.

The remainder of the Procedure Interface screen 47 is used for display of the current procedure. First, the steps that have been implemented are shown in a scrollable area 63. The status of the step when it was exited is shown, as well as the time at which it was exited. Next, the current procedure step is displayed at 65. The status of the relevant plant components and parameters for the step are displayed at 67. This is an active area, and any changes to the plant, either through operator or plant-induced actions, will be clearly visible in this area, since the plant data is updated. This area is also scrollable, except that the high-level statement representing the purpose of the step is always shown. The upcoming steps are displayed in a scrollable area 69, allowing the operator to view what conditions and/or actions are expected in the future.

In the example of the Procedure Interface screen 47 shown in FIG. 3, "Procedure A" is the active procedure, and it is being implemented in the "manual" mode. Step 6 is the current step. This step involves checking conditions of operation of SLKT #4. The relevant parameters to do so are the HP C, left outside position, which is to be CLOSED, and the HPGV-L-I SLOW MAGNET, which is to be ON. Therefore, at the time shown, step 6 is not satisfied. A period of 4 minutes and 53 seconds remains for the step to become satisfied. When it becomes satisfied, the user will push the "next" button to manually advance to step 7. If the step is not satisfied after the time period, the operator will either attempt to satisfy the necessary conditions or he may manually proceed to step 7. However, when the operator does so, the system will provide a pop-up confirmation notice to him to insure that he does indeed want to continue even though the process parameter conditions are not satisfied.

Figure 4:
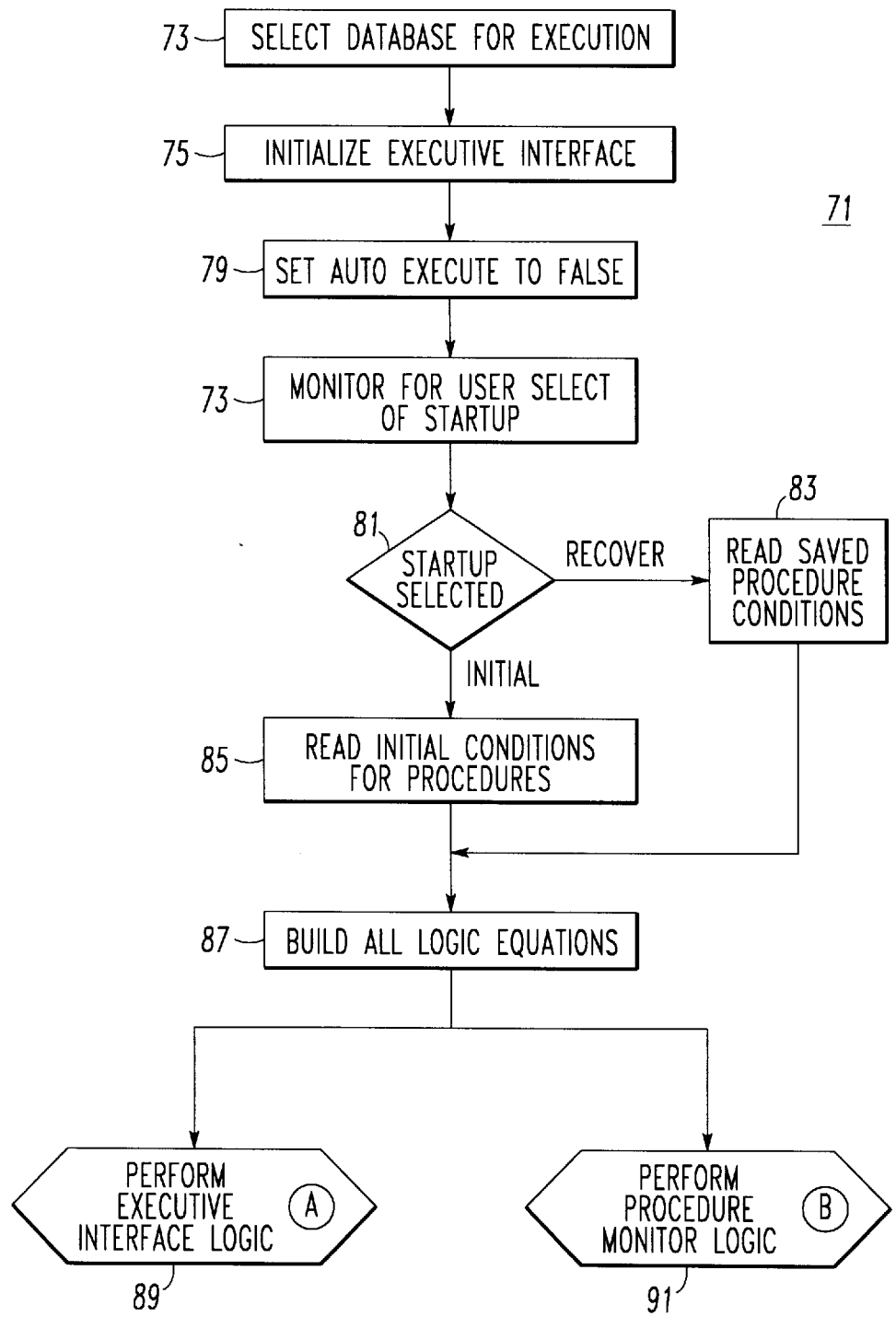
FIG. 4 illustrates the layout of the Procedure Interface.

FIGS. 4–12 are flow charts illustrating operation of the SSCI 15. FIG. 4 illustrates the start-up routine 71. The appropriate database is selected at 73 and the Executive Interface 33 is initialized at 75. The global auto execute feature is turned off at 77. If the operator selects start-up in the recovery mode at 79 and 81, then the saved procedure conditions are read at 83, otherwise, the initial conditions for the procedures are used at 85. In either case, the logic equations are constructed at 87 and then the Executive Interface logic and the monitor logic are run at 89 and 91.

Figure 5:
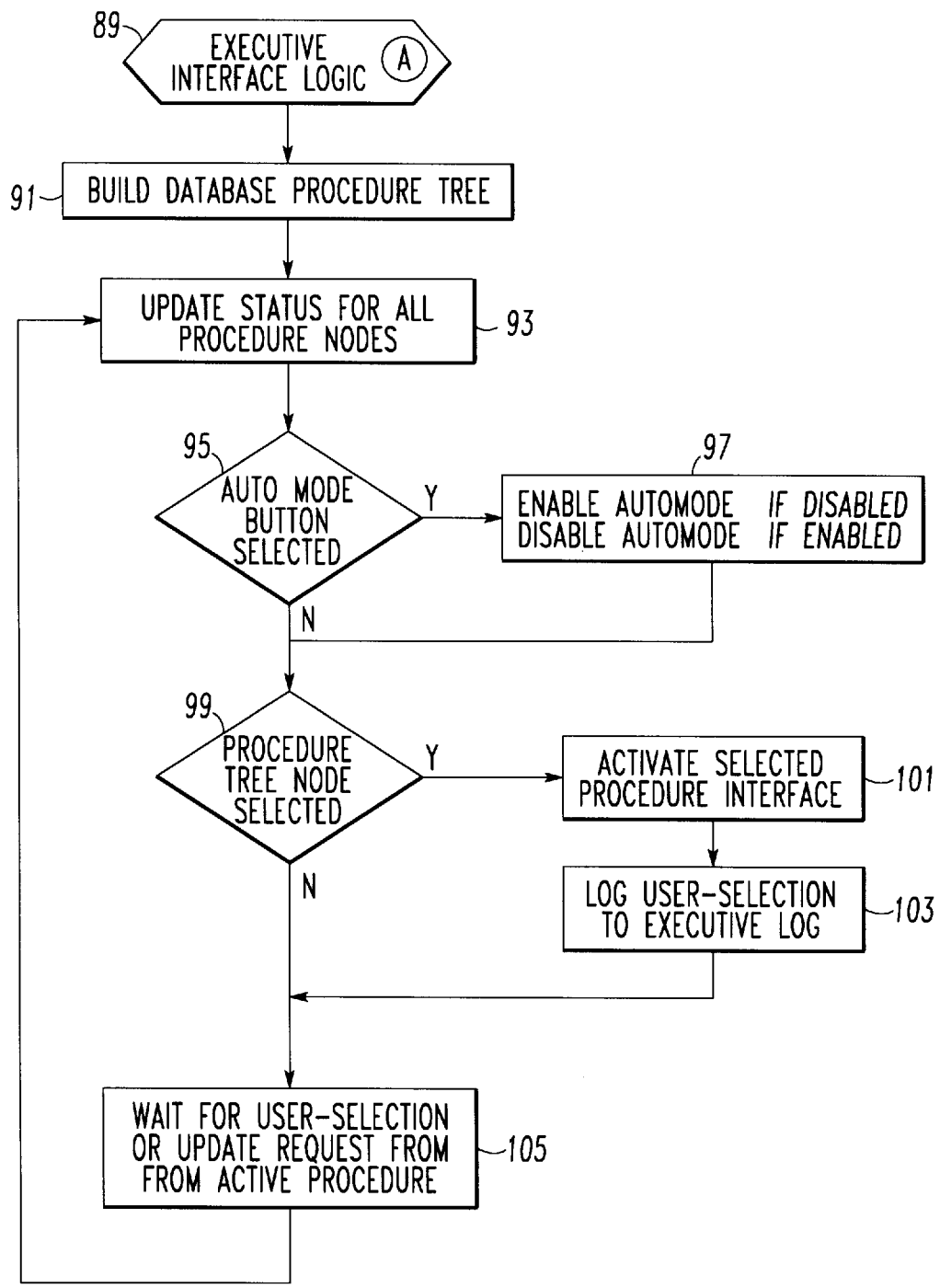
FIGS. 5–14 are flow charts of the software which forms part of the invention.

The Executive Interface routine 89 is shown in FIG. 5. The circled letter tags show the transitions between the various routines of FIGS. 4–12. The Executive Interface logic 89 first builds the procedure tree at 91 and updates the status for the procedures at 93. If the global auto mode button is selected at 95, the auto mode is toggled at 97, that is, if it was enabled then it is disabled and vice versa. If a procedure in the tree is selected as detected at 99, the selected Procedure Interface is activated at 101 and the selection is logged at 103. The routine then waits at 105 for another user selection or a request for an update from an active procedure.

Figure 6:
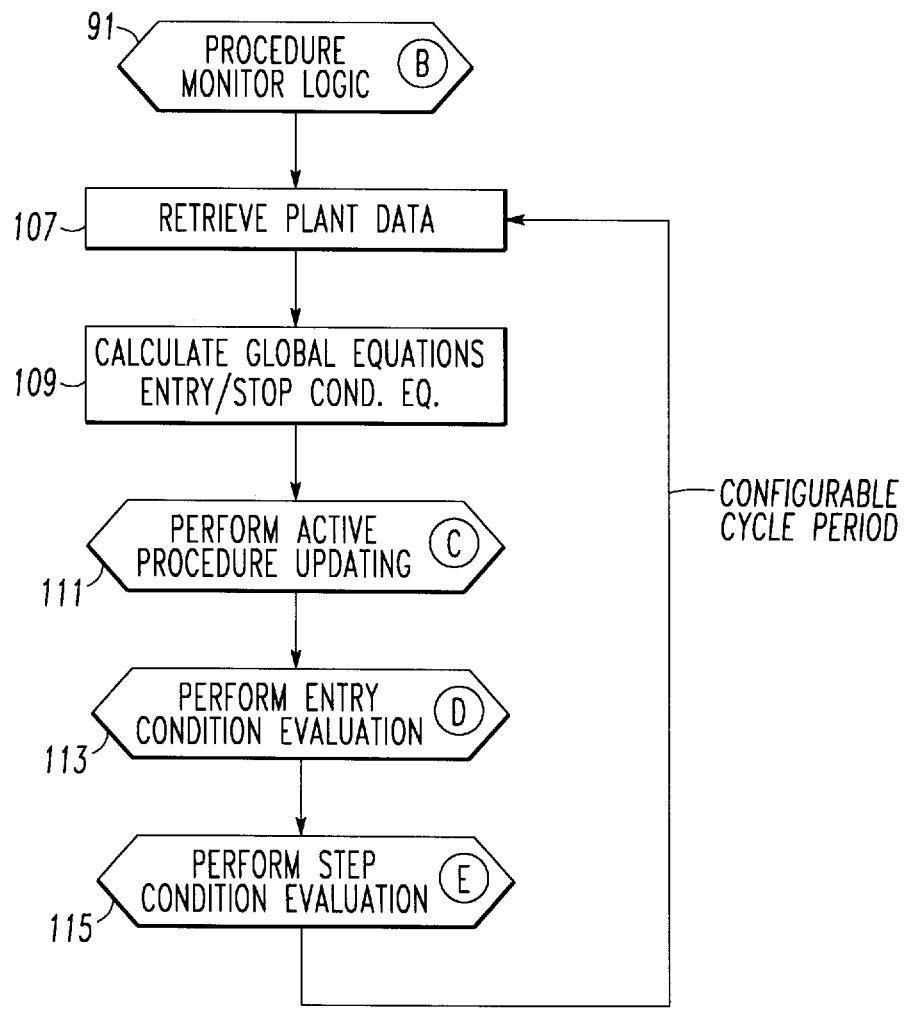

The procedure monitor logic routine 91 is run continuously. The flow chart for this routine is shown in FIG. 6. Updated plant data from the data highway is input at 107. It is used to calculate the global equations and entry and stop conditions at 109. The active procedure updating, entry condition evaluation, and stop condition evaluation routines are then sequentially called at 111 through 115. A configurable time delay is then implemented before the routine begins another cycle.

Figure 7:
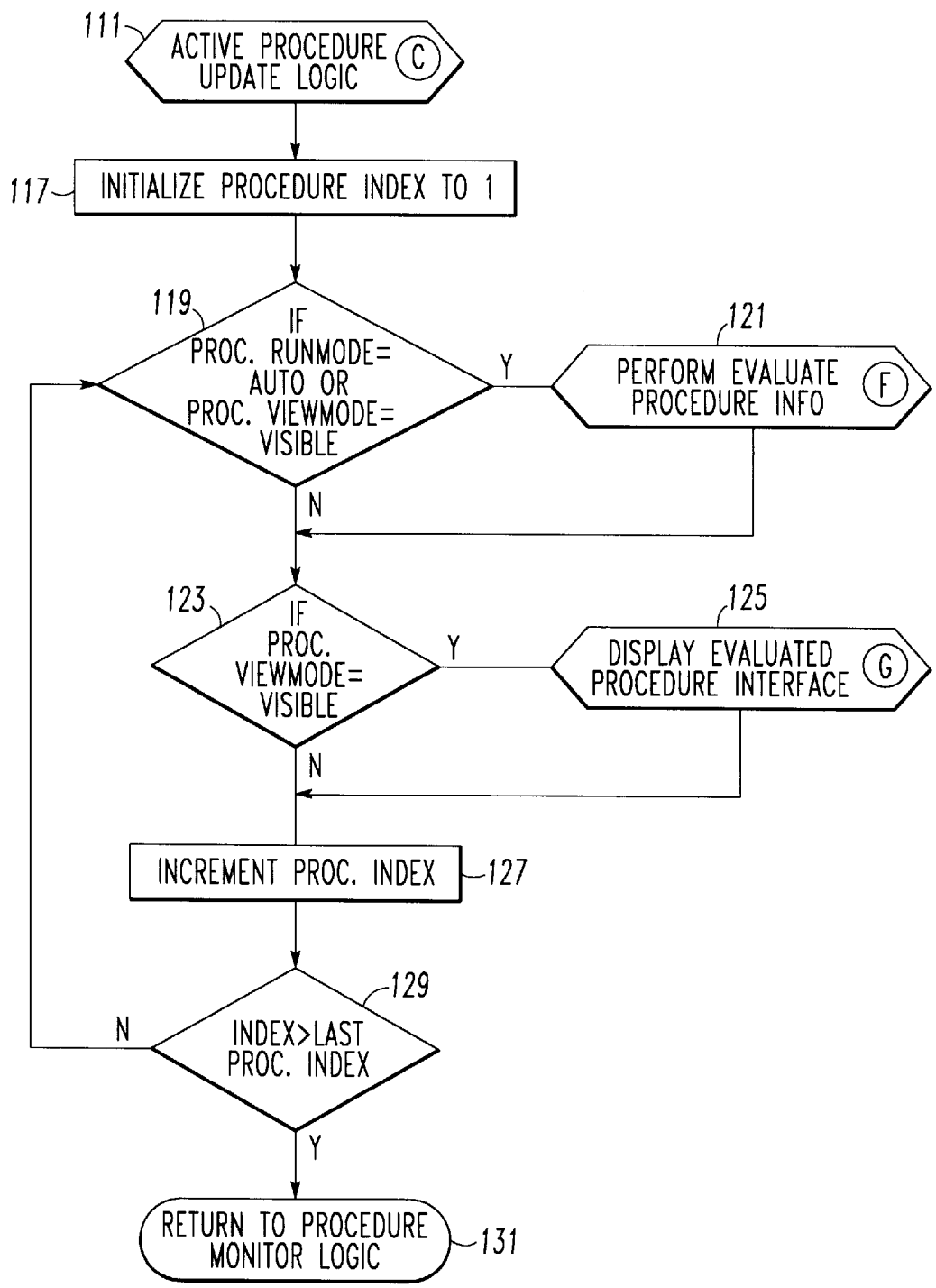

The active procedure update logic 111 is illustrated in FIG. 7 and is begun by initializing a procedure index to the first procedure at 117. If the procedure is in auto or is set for presentation on the Procedure Interface screen as determined at 119, the evaluate procedure information routine is called at 121. If the procedure view mode is visible, as determined at 123, then a routine for displaying the Procedure Interface for that procedure is called at 125. This process is repeated for each of the procedures at 127 and 129 before the routine returns at 131 to the procedure monitor logic routine of FIG. 6.

Figure 8:
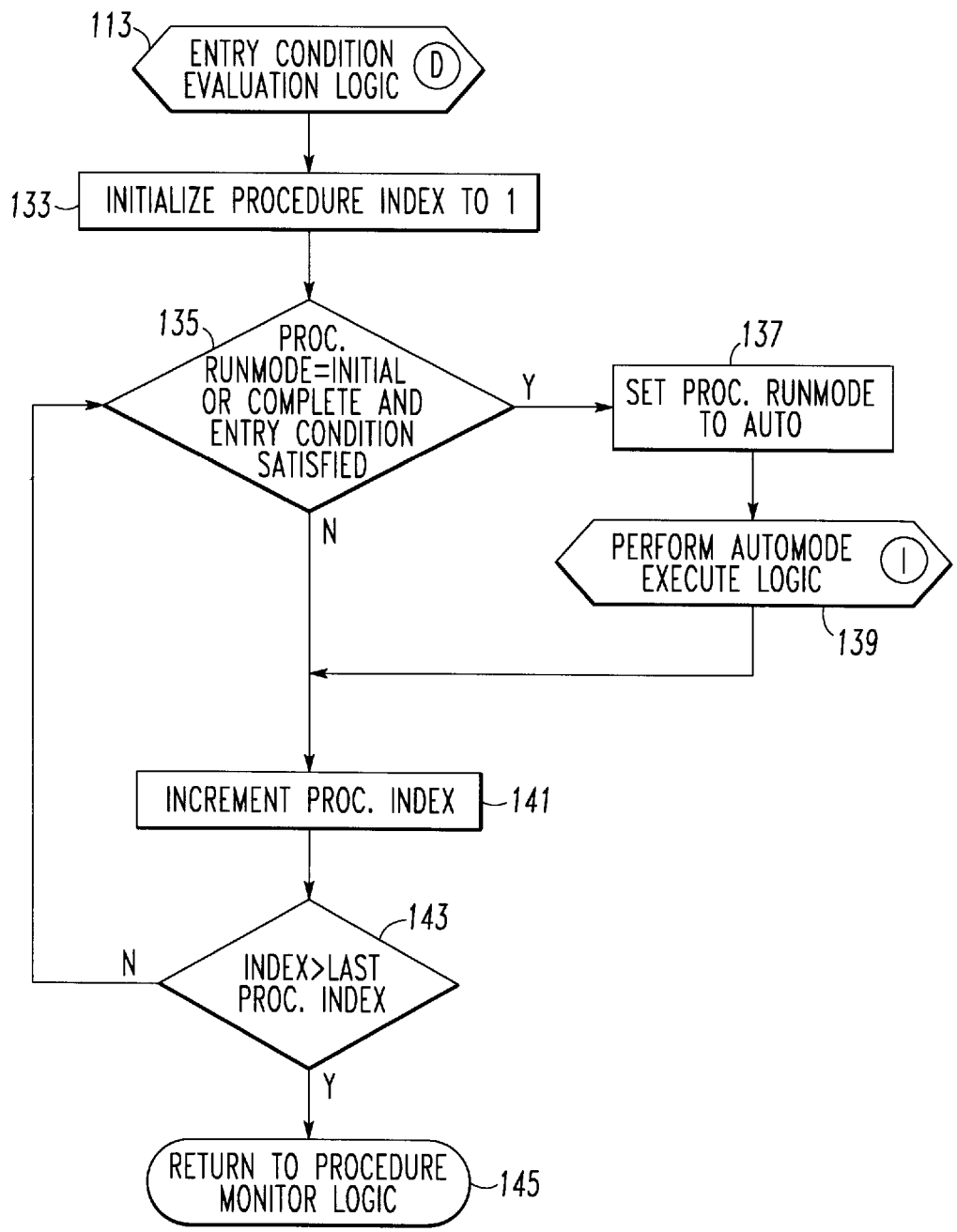

FIG. 8 illustrates the entry conditions evaluation routine 113 which begins by setting a procedure index to the first procedure at 133. If the mode of the procedure is "initial" or "complete" and the entry conditions are satisfied, as determined at 135, the run mode is set to "auto" at 137 and the auto execute logic is called at 139. This logic is performed for each of the procedures at 141 and 143 before returning at 145 to the procedure monitor logic of FIG. 6.

Figure 9:
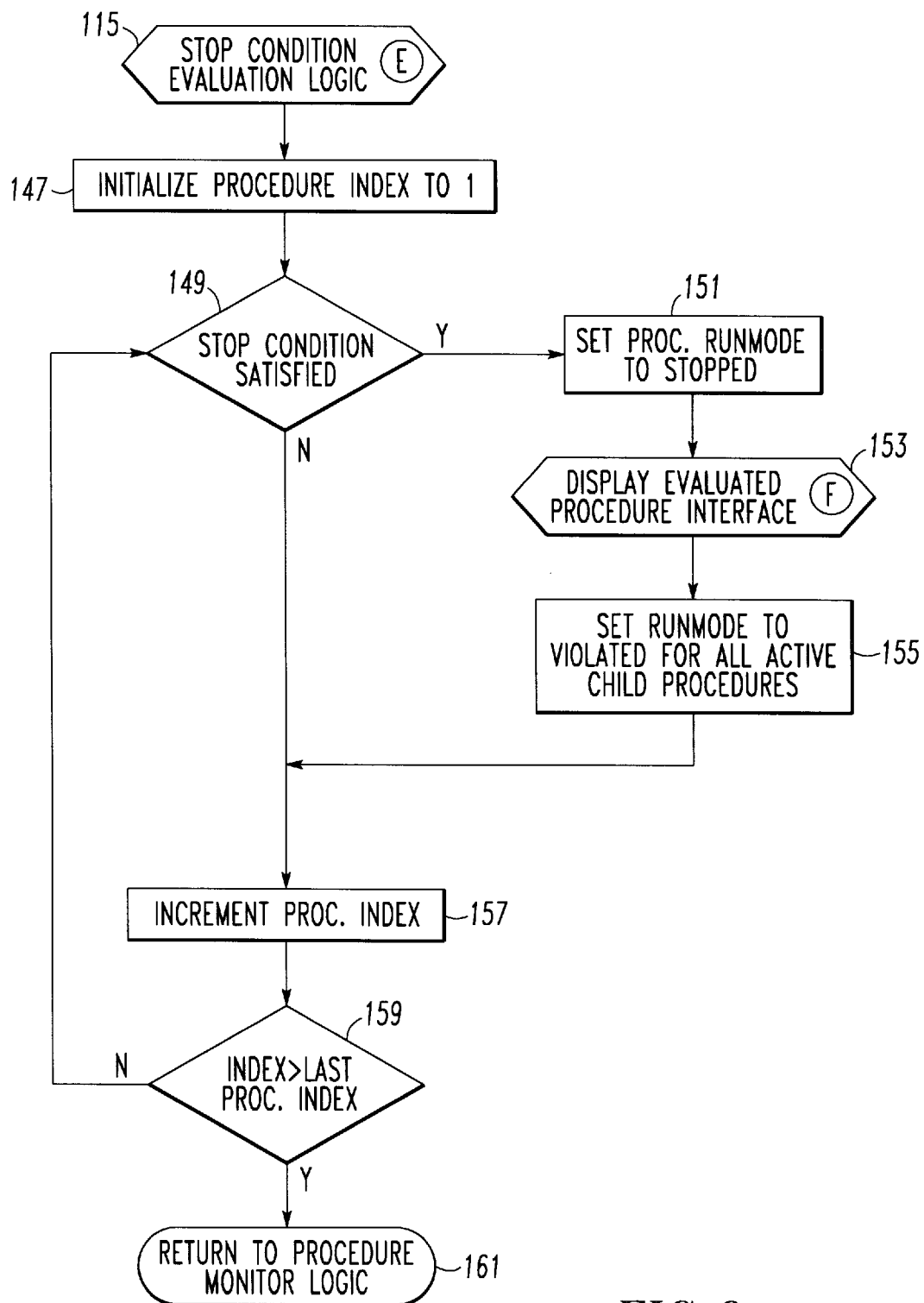

The step condition evaluation logic 115, shown at FIG. 9, begins with setting a procedure index to the first procedure at 147. If the procedure stop condition is satisfied at 149, the run mode is set to "stopped" at 151 and the display evaluated Procedure Interface is called at 153. As some procedures can spawn other procedures (child procedures) while the parent continues to remain active, if the stop conditions are satisfied for the parent, the run mode of each of the active child procedures is set to "violated" it at 155 upon return from the display evaluated Procedure Interface at 153. This stop evaluation routine is run for each of the procedures at 157 and 159 before returning at 161 to the procedure monitor logic.

Figure 10:
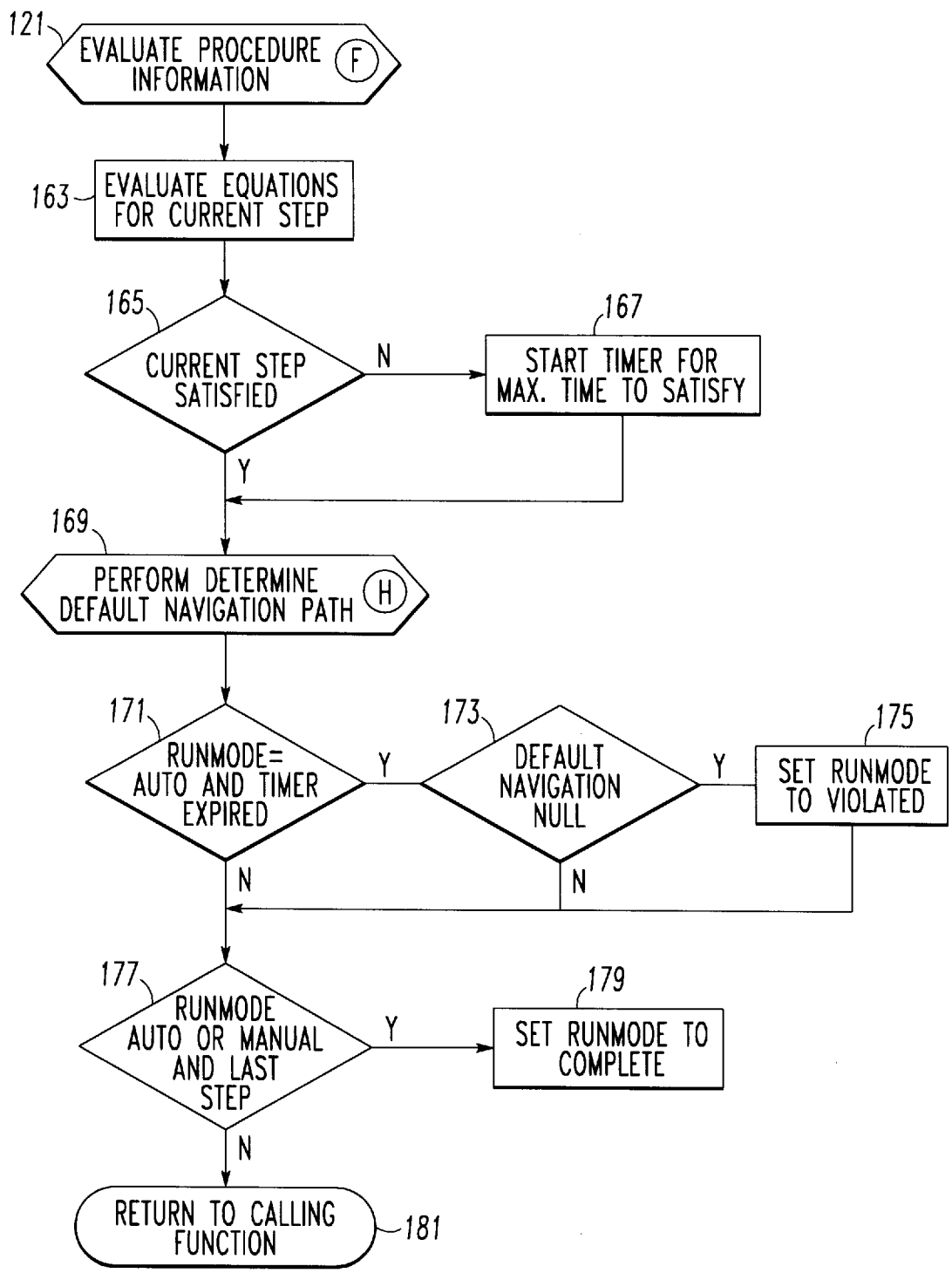

The perform evaluate procedure information routine 121 is shown in FIG. 10. First, the equations for the current step are evaluated at 163. If the current step is not satisfied as determined at 165, then a timer is started to allow time for the condition to become satisfied. If, for instance, a step calls for starting a pump, it will take a period of time for confirmation that the pump has, in fact, started. This delay timer can be programmed to allow the appropriate time for this to occur. Next, the determine default navigation path routine is called at 169. Upon return from the called routine, if the procedure is in the automatic mode and the timer has expired at 171, and the default navigation is null, as determined at 173, meaning that there is no place for the procedure to go, then the run mode is set to "violated" at 179. In any case, if the run mode is in "auto" or "manual" (the procedure is active) and this is the last step of the procedure, as determined at 177, then the run mode is set to "complete" at 179 before the routine returns at 181 to the calling routine.

Figure 11:
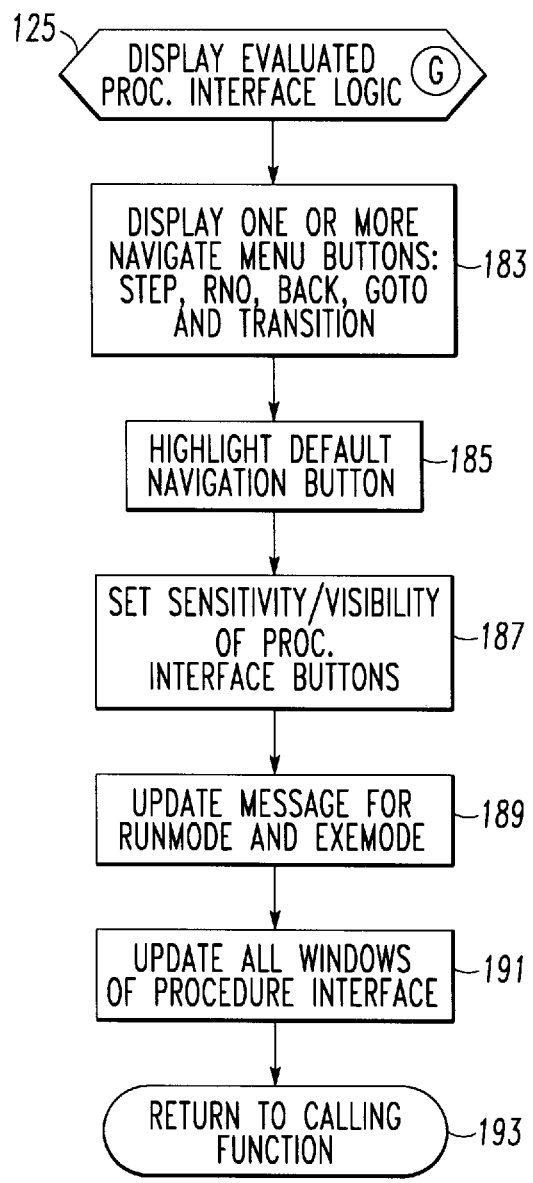

FIG. 11 illustrates the display evaluated Procedure Interface logic 125. First, one or more of the navigate menu buttons are displayed at 183. These include a "step" button which enables navigations to the next step, sub-step or sub sub-step. It is not displayed if the current step is the last step of the procedure. If the required response was not obtained for the current step, and an alternative is available, an RNO (Response Not Obtained) button is displayed. Except for the first step of a procedure, a BACK button enables the operator to select a previous high level step. A GOTO button enables navigation to an out of sequence step in the current procedure. A TRANS button enables transitions to other procedures including child procedures. The default navigation button is then highlighted at 185 to indicate the path suggested by the system. This routine also sets the sensitivity and visibility of the buttons at 187, updates the message area at 189 and updates all the windows of the Procedure Interface at 191 before returning at 193 to the calling routine.

Figure 12:
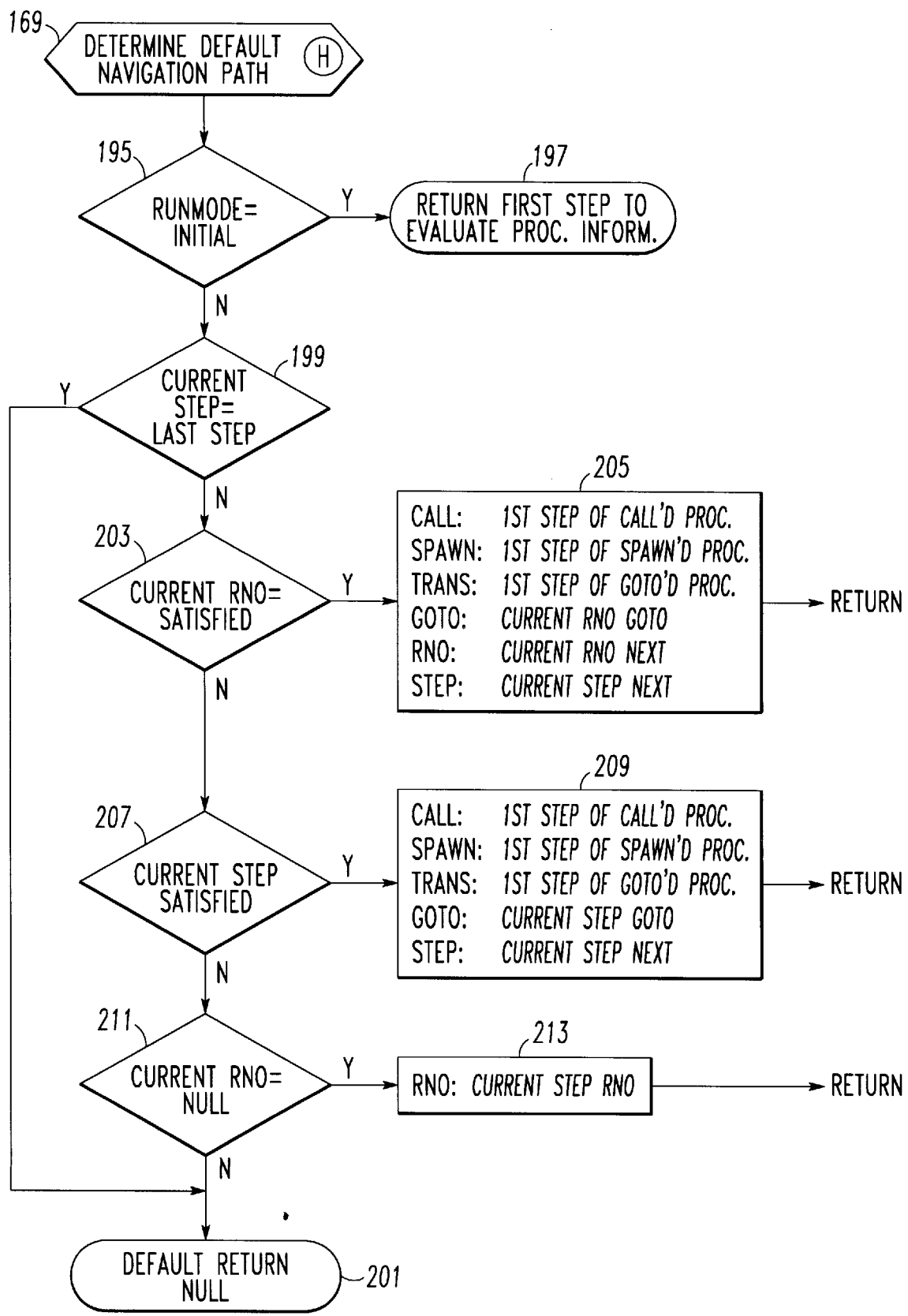

The routine 169 for determining the default navigation path is shown in FIG. 12. If the procedure is in the "initial" mode at 195, then the path is set to the first step and the routine returns at 197 to the evaluate procedure information routine of FIG. 10. If the current step is the last step in the routine, as determined at 199, then there is no further path and the routine returns at 201. For other than the last step, if the current RNO was satisfied, as determined at 203, then the path is determined at 205. These paths include the first step of a called procedure, a spawned (child) procedure or a transition procedure. The GOTO, RNO and STEP transitions are all within the same procedure. If the current RNO is not satisfied at 203, but the current step is satisfied at 207, then a path is indicated at 209. If the current step is not satisfied and the current RNO is null at 211, then the RNO is the current step RNO as indicated at 213, otherwise, the routine returns at 201 with no suggested path.

Figure 13:
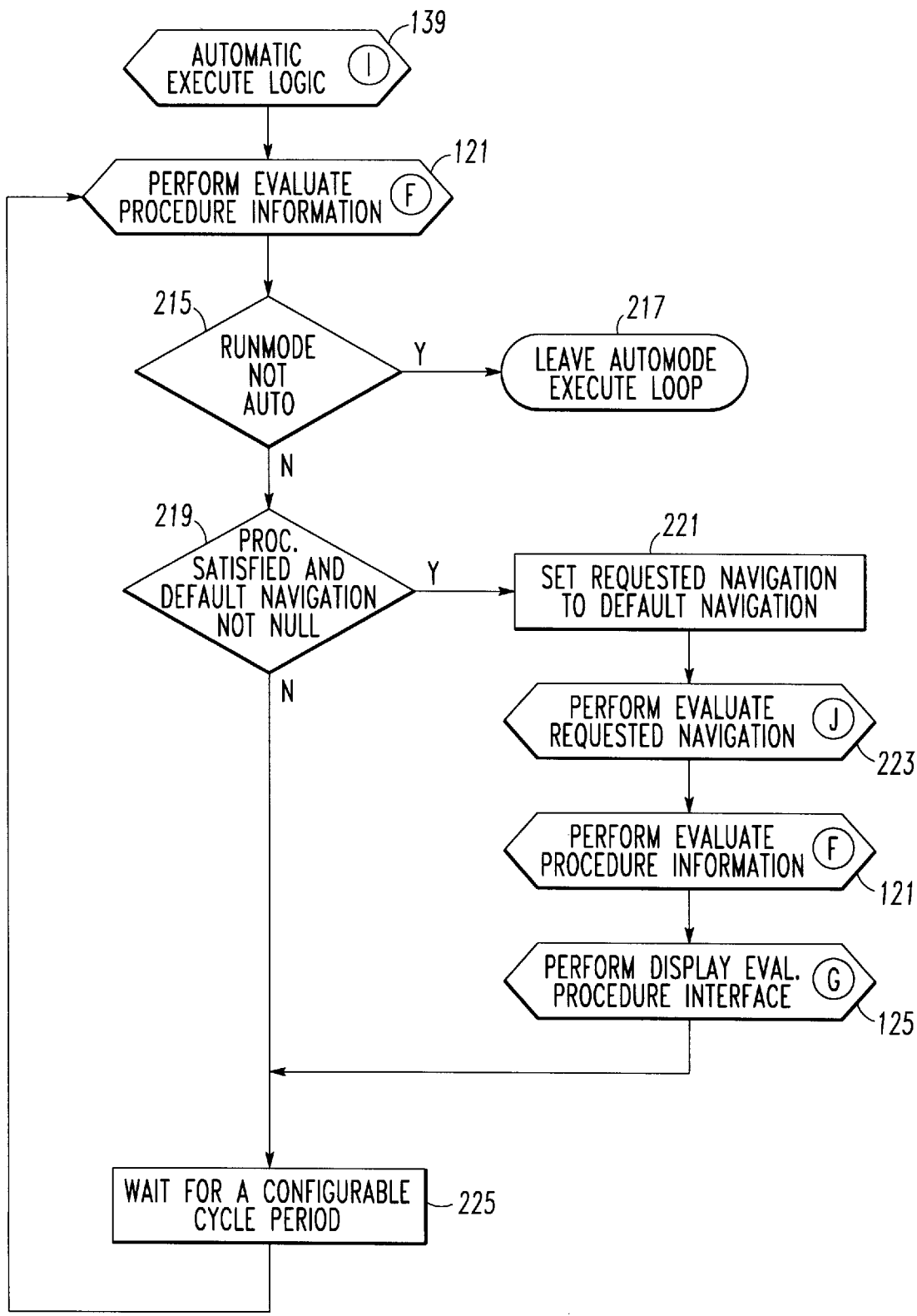

FIG. 13 illustrates the auto execute logic 139. First, the evaluate procedure information routine 121 is called. Upon return, if the procedure is not in the "auto" mode, as determined at 215, then the auto execute routine is exited at 217. On the other hand, if the procedure is in the "auto" mode and the procedure is satisfied and default navigation is not null, as determined at 219, the requested navigation is set to the default navigation at 221 and the evaluate requested navigation routine 223, the evaluate procedure information routine 121, and the display evaluation Procedure Interface routine 125 are sequentially performed. A configurable time delay is inserted in the loop at 225 to allow the timing of the automatic sequencing to be set, for instance, to allow the operator to follow automatic execution of the procedure.

Figure 14:
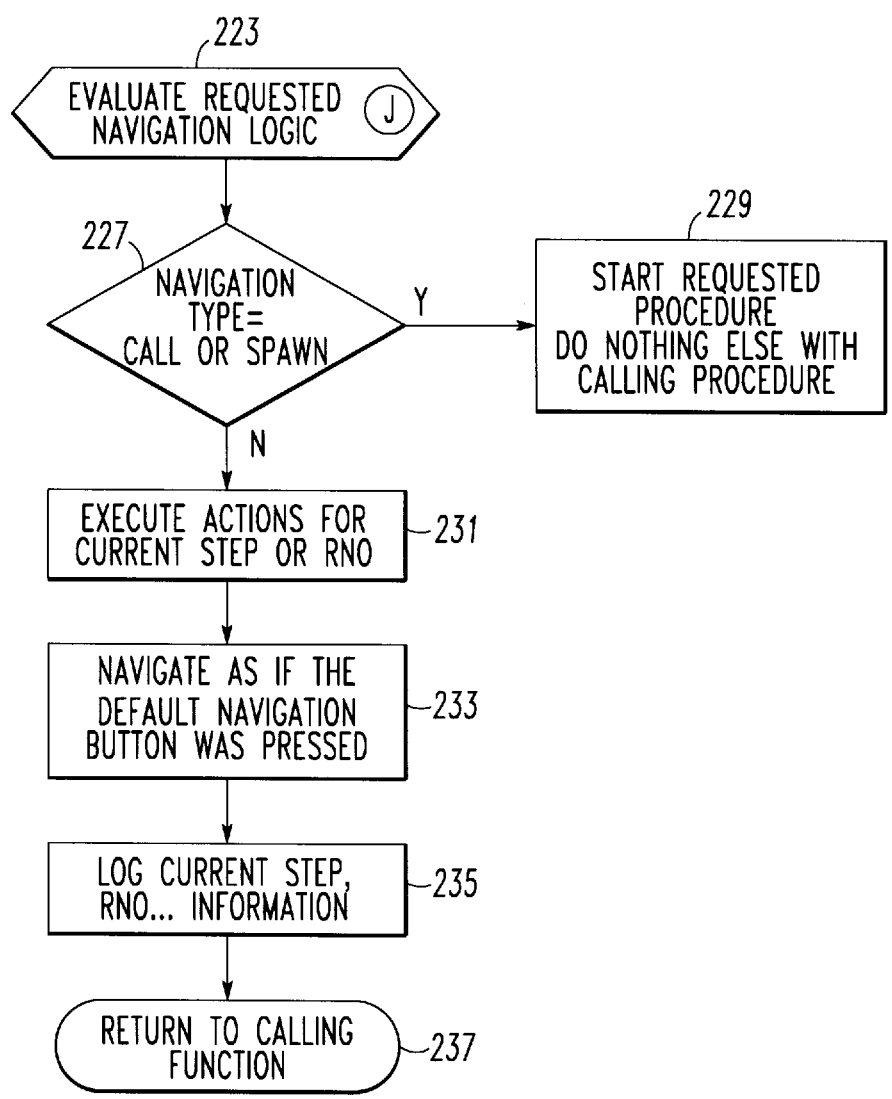

The evaluate requested navigation routine 223 is illustrated in FIG. 14. If the navigation type is "call" or "spawn", as determined at 227 and indicating a transfer to another procedure, the requested procedure is started at 229. Nothing else is done with the calling procedure. Otherwise, the actions for the current step or RNO are executed at 231 and the system navigates as if the default navigation button were pressed at 233. The current step, RNO, etc. is logged at 235 before the routine returns at 237 to the calling routine.

The current invention provides an operator with a more efficient and faster system for executing procedures in a complex process facility by providing the opportunity for running multiple procedures simultaneously, some or all of which can be run automatically but with close supervision and oversight.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breath of the claims appended and any and all equivalents thereof.

What is claimed is:

1. A method of executing procedures for a complex process facility comprising:

monitoring selected process conditions;

generating and storing a plurality of procedures each comprising a set of sequential steps at least some of which steps require verification of certain of said selected process conditions;

providing means automatically sequencing through and excuting said sequential steps of said procedures; and providing an operator interface presenting to an operator a representation of said sequential steps as they are executed and means by which the operator can selectively assume manual control of selected procedures.

2. The method of claim 1 wherein said step of generating and storing a plurality of procedures comprises using a relational database to generate equations representing said sequential steps and wherein said equations are executed for automatically sequencing through and excuting said sequential steps.

3. The method of claim 1 wherein said step of generating and storing a plurality of procedures include setting stop conditions and wherein automatically sequencing includes stopping sequencing through said sequential steps of a procedure when a stop condition is detected.

4. The method of claim 3 wherein said automatically sequencing includes stopping automatically sequencing through said sequential steps when a specified process condition called for by a step is not satisfied.

5. The method of claim 4 including providing a time delay for said specified process condition to be met before stopping said automatically sequencing through said sequential steps.

6. The method of claim 4 including providing through said operator interface means for said operator to override said stopping of said automatically sequencing through said sequential steps.

7. The method of claim 4 wherein said step of generating and storing a plurality of procedures further comprises generating selected start conditions for certain of said procedures and automatically starting a procedure when said starting conditions are satisfied.

8. The method of claim 1 wherein said step of generating and storing a plurality of procedures further comprises generating selected start conditions for certain of said procedures and automatically starting a procedure when said starting conditions are satisfied.

9. The method of claim 8 wherein the step of providing an operator interface includes providing means for selectively enabling and disabling automatic starting of procedures in response to the satisfaction of said start conditions.

10. The method of claim 1 wherein the step of generating and storing said plurality of procedures includes selectively setting time delays for automatically sequencing through said steps.

11. The method of claim 1 wherein said step of generating and storing procedures includes generating control signals to modify process conditions and wherein said automatically sequencing through and excuting said steps includes automatically generating said control signals.

12. The method of claim 11 wherein said step of providing an operator interface includes providing means for the operator to block said automatically generating said control signals.

13. The method of claim 11 including providing time delays for automatically sequencing between said steps.

14. The method of claim 13 wherein said step of providing time delays and automatically sequencing between said steps comprises providing time delays sufficient for said process conditions to change in response to said control signal.

15. The method of claim 1 wherein said step of providing an interface for said operator includes providing an executive summary presenting a mode for each of said plurality of procedures and means for an operator to select an automatic and a manual mode for each of said procedures.

16. The method of claim 15 wherein said step of automatically sequencing through and excuting steps of said procedures includes automatically sequencing through and excuting a number of said plurality of procedures at the same time.

17. The method of claim 1 wherein said step of automatically sequencing through and excuting steps of said procedures includes automatically sequencing through and excuting a number of said plurality of procedures at the same time.

18. A method of executing procedures for a complex process facility comprising:
monitoring selected process conditions;
generating and storing a plurality of procedures each comprising a set of sequential steps at least some of which steps require verification of certain of said process conditions;
providing means automatically sequencing through and excuting said sequential steps of multiple procedures simultaneously; and
making available to an operator through an operator interface a representation of said sequential steps of each of said multiple procedures as they are being executed.

19. The method of claim 18 wherein said step of generating and storing a plurality of procedures comprises using a relational database to generate equations representing said sequential steps and wherein said equations are executed for automatically sequencing through and excuting said sequential steps.

20. The method of claim 18 including providing through said operator interface an executive summary indicating a mode of each of said plurality of procedures.

21. The method of claim 20 including providing through said operator interface means for an operator to select certain of said procedures for automatic status and automatically sequencing through and excuting such procedures.

22. The method of claim 21 wherein said step of making available to an operator the steps being executed, includes providing an interface in which the steps being executed by at least two of said multiple procedures being executed are presented to the operator simultaneously.

23. A system for executing procedures for a complex process facility comprising:
means for monitoring selected process conditions;
storage means for storing a plurality of procedures each comprising a set of sequential steps at least some of which steps require verifications of certain of said selected process conditions;
means for automatically sequencing through and excuting said sequential steps of said procedures; and
an operator interface selectively presenting to an operator a representation of steps of said selected procedures as they are automatically executed.

24. The system of claim 23 wherein said means for automatically sequencing through and excuting comprises means for simultaneously sequencing through and excuting multiple procedures.

25. The system of claim 24 wherein said operator interface includes an executive summary presentation indicating a mode of each of said plurality of said procedures and including means for selecting a mode for each of said plurality of procedures.

26. A system for executing procedures for a complex process facility comprising:
monitoring means for monitoring selected process conditions;
storage means for storing a plurality of procedures each comprising a set of sequential steps at least some of which steps require verification of certain of said selected process conditions;
means for simultaneously sequencing through and excuting said sequential steps of multiple procedures; and
an operator interface having means for an operator to select said multiple procedures for simultaneous execution and for making available to the operator a representation of the steps of said multiple procedures as they are being executed.

* * * * *